United States Patent [19]

Foster et al.

[11] Patent Number: 4,458,952
[45] Date of Patent: Jul. 10, 1984

[54] TRIM MEMBER FOR A VEHICLE WHEEL

[75] Inventors: Edwin E. Foster; Thomas E. Foster, both of Austin, Tex.

[73] Assignee: Michael Ladney, Jr., Grosse Pointe Shores, Mich.

[21] Appl. No.: 461,616

[22] Filed: Jan. 27, 1983

Related U.S. Application Data

[63] Continuation of Ser. No. 229,557, Jan. 29, 1981, abandoned.

[51] Int. Cl.³ .............................................. B60B 7/06
[52] U.S. Cl. ............................... 301/37 TP; 301/37 P; 301/37 S
[58] Field of Search .................. 301/37 P, 37 R, 37 S, 301/37 SC, 37 TP, 37 PB, 37 H, 37 C, 37 CD, 108 R, 108 S, 108 SC

[56] References Cited

U.S. PATENT DOCUMENTS

| | | | |
|---|---|---|---|
| 2,794,684 | 6/1957 | Lyon | 301/37 TP |
| 2,819,929 | 1/1958 | Hunt | 301/108 R |
| 3,480,329 | 11/1969 | Foster et al. | 301/37 R |
| 4,027,919 | 6/1977 | Foster et al. | 301/37 TP |
| 4,133,583 | 1/1979 | Spisak | 301/37 TP |
| 4,357,053 | 11/1982 | Spisak | 301/37 R |

FOREIGN PATENT DOCUMENTS

| | | | |
|---|---|---|---|
| 446833 | 3/1949 | Italy | 301/37 S |
| 102702 | 8/1980 | Japan | 301/37 S |

*Primary Examiner*—Charles A. Marmor
*Attorney, Agent, or Firm*—Barnes, Kisselle, Raisch, Choate, Whittemore & Hulbert

[57] ABSTRACT

A vehicle wheel trim member has a round spring steel ring mounted on the inboard face thereof adapted to engage in grooves in the wheel mounting lug nuts or the studs on which they are threaded to releasably retain the trim member on the wheel. The ring is dimensioned to be flexed radially into non-circular shape and thereby assume a stressed condition when engaged in the grooves. The ring is mounted on the trim member such that the retention forces generated by the flexed ring are absorbed entirely by the studs and not by the trim member. Distortion and warpage of the trim member is thus avoided.

9 Claims, 23 Drawing Figures

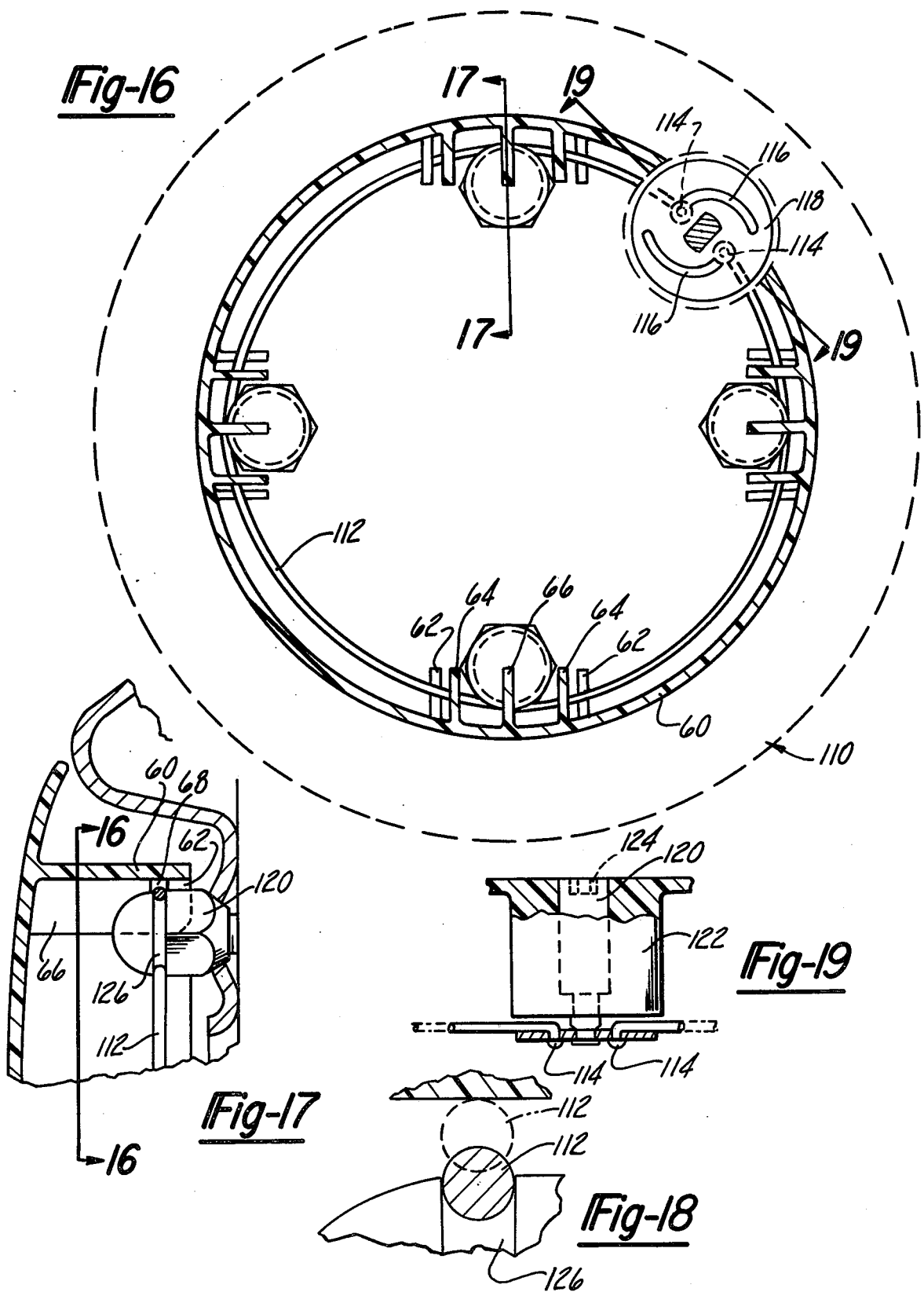

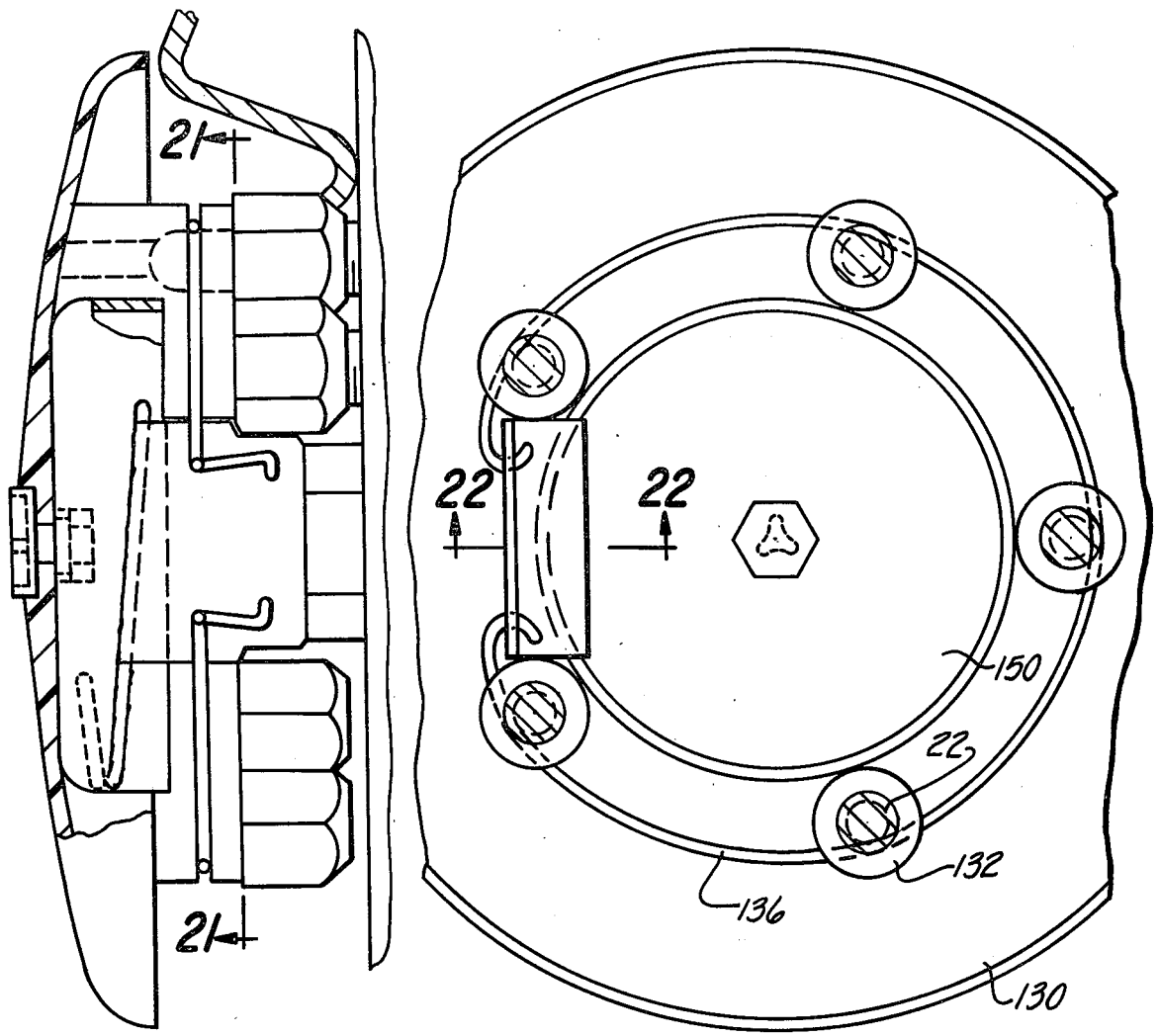
Fig-20
Fig-21
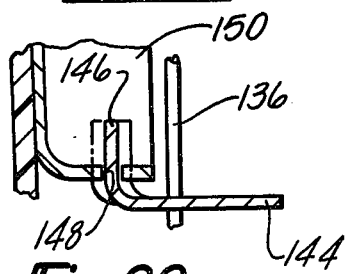
Fig-22
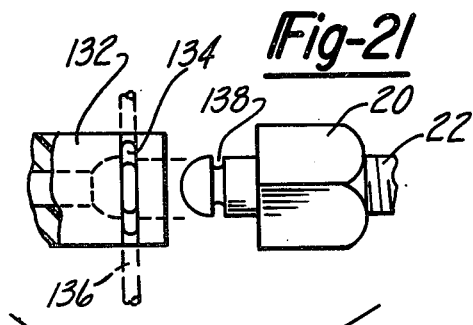
Fig-23

TRIM MEMBER FOR A VEHICLE WHEEL

This is a continuation of application Ser. No. 06/2229,557, filed Jan. 29, 1981, now abandoned.

This invention relates to a vehicle wheel trim member, such as a hub cap or a wheel cover, and, more particularly, to a means for removably retaining the trim member on the wheel by interengagement with the wheel lug retention arrangement.

It has been heretofore proposed to retain a hub cap on a vehicle wheel by mounting spring members on the inboard face of the hub cap arranged to resiliently engage the wheel mounting lug nuts or studs on which the nuts are threaded. However, in the prior art arrangements we are familiar with the spring members are fixedly mounted on the hub cap and the forces developed by flexing of the springs when engaged with the lug nuts or the studs are transferred to a very substantial extent to the hub cap itself. If the hub cap is formed of thin sheet metal it is apt to distort either resiliently or permanently. If the hub cap is formed of plastic it may distort and develop a permanent set. In either event, after prolonged use the spring retention forces may diminish substantially so that the hub cap becomes loose and may easily be accidentally jarred off a wheel which encounters a bump or a chuck hole or while the wheel is negotiating a sharp turn. This is potentially dangerous, especially in the case of a wheel cover which is larger and normally heavier than a hub cap.

It is an object of this invention to provide a retention arrangement for a vehicle wheel trim member which utilizes a spring member and the wheel lug nuts or studs for retaining the trim member on the wheel, the spring member being mounted on the trim member in a manner such that the forces generated by retention of the trim member on the wheel are absorbed by the studs and are not transferred to the trim member.

A further object of the invention is to provide a retention arrangement of the type described wherein a resilient ring on the trim member is adapted to engage in grooves on the lug nuts or studs to securely, but removably, retain the trim member on the wheel, the ring being mounted on the trim member such that the forces generated by radial flexing of the ring when engaged with the grooves are transferred directly to the studs and not to the trim member.

More specifically, the invention contemplates a trim member for a vehicle wheel, such as a hub cap or a wheel cover, having a resiliently flexible ring mounted on the inboard face thereof so as to engage with grooves on the lug nuts or studs. The ring is seated on the trim member within a plurality of radially extending and circumferentially spaced slots in the trim member which permit the ring to flex radially freely to the required extent without restriction from the trim member. The trim member also has abutments thereon for restricting relative rotational movement between the trim member and the wheel.

Other objects, features and advantages of the present invention will become apparent from the following description and accompanying drawings, in which:

FIG. 16 is a sectional view of another form of trim member according to the present invention taken along the line 16—16 in FIG. 17;

FIG. 17 is a sectional view along the line 17—17 in FIG. 16;

FIG. 18 is a fragmentary sectional view on an enlarged scale of a portion of the structure shown in FIG. 17;

FIG. 19 is a sectional view along the line 19—19 in FIG. 16;

FIG. 20 is a fragmentary sectional view of another form of trim member according to the present invention;

FIG. 21 is a sectional view along the line 21—21 in FIG. 20;

FIG. 22 is a fragmentary sectional view along the line 22—22 in FIG. 21; and

FIG. 23 is a fragmentary view illustrating the manner in which the ring shown in FIG. 21 is engageable with the ends of the lug nut studs.

Figure 1:
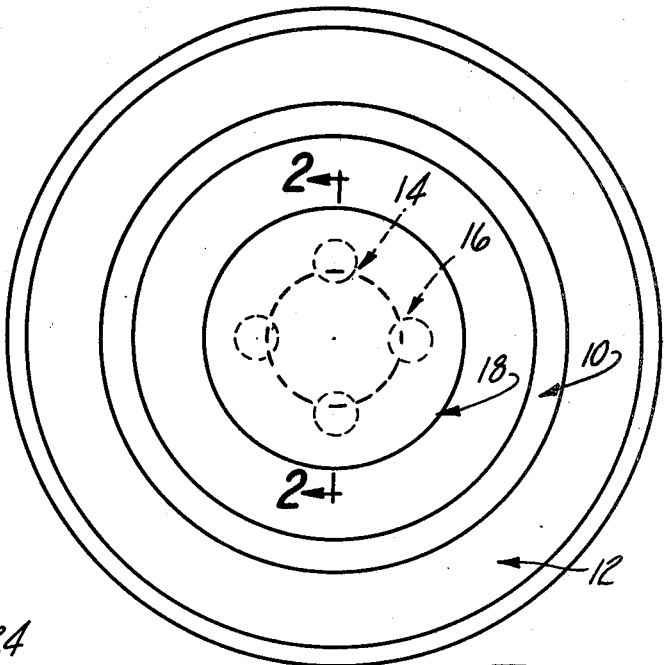
FIG. 1 is a plan view of the outboard face of a vehicle wheel having the trim member of the present invention applied thereto.

In FIG. 1 there is illustrated a vehicle wheel 10 having a tire 12 mounted thereon, the wheel being mounted on a wheel hub by means of a plurality of lug nut assemblies 14 spaced circumferentially around the bolt-on flange 16 of the wheel. In the arrangement shown in FIGS. 1 through 6 the wheel trim member comprises a hub cap 18.

Figure 2:
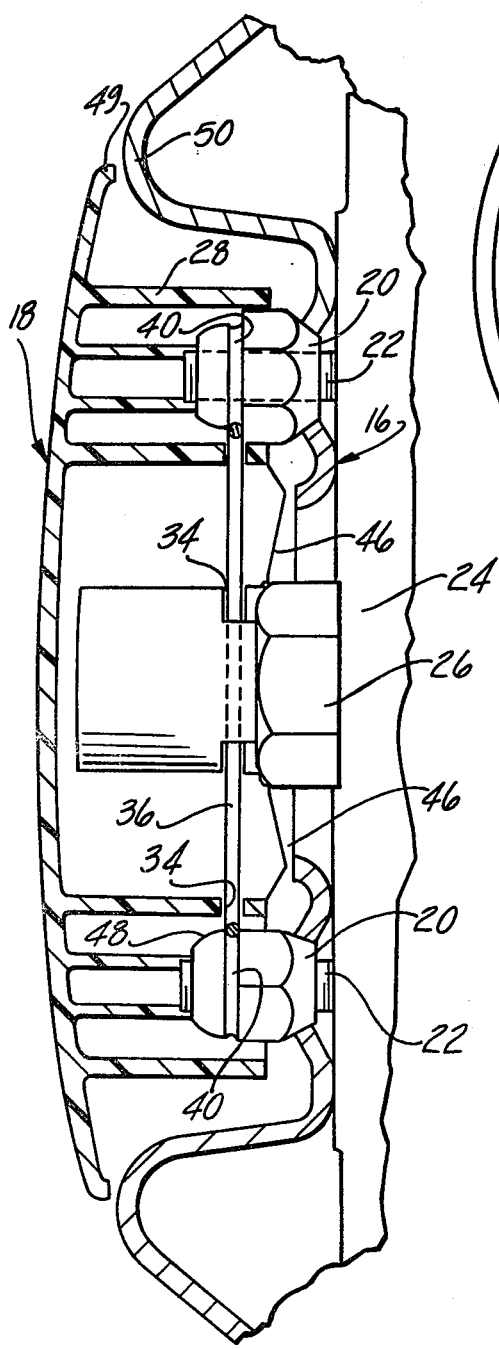
FIG. 2 is a sectional view along the line 2—2 in FIG. 1.
Figure 4:
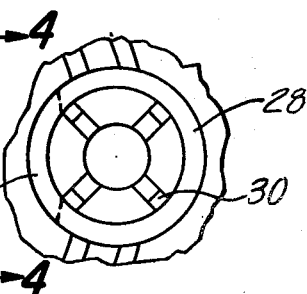
FIG. 4 is a fragmentary side elevational view in the direction of the line 4—4 in FIG. 3.
Figure 3:
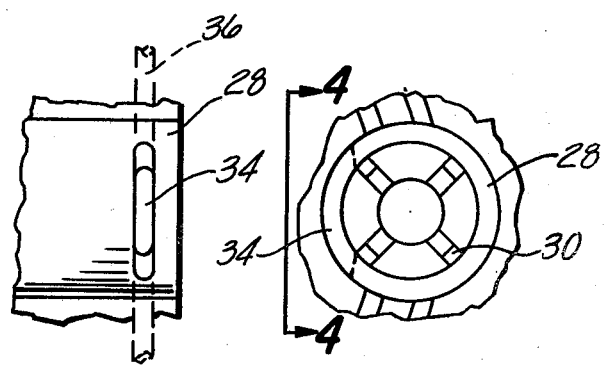
FIG. 3 is a fragmentary plan view of a portion of the trim member as seen from the inboard face thereof.
Figure 5:
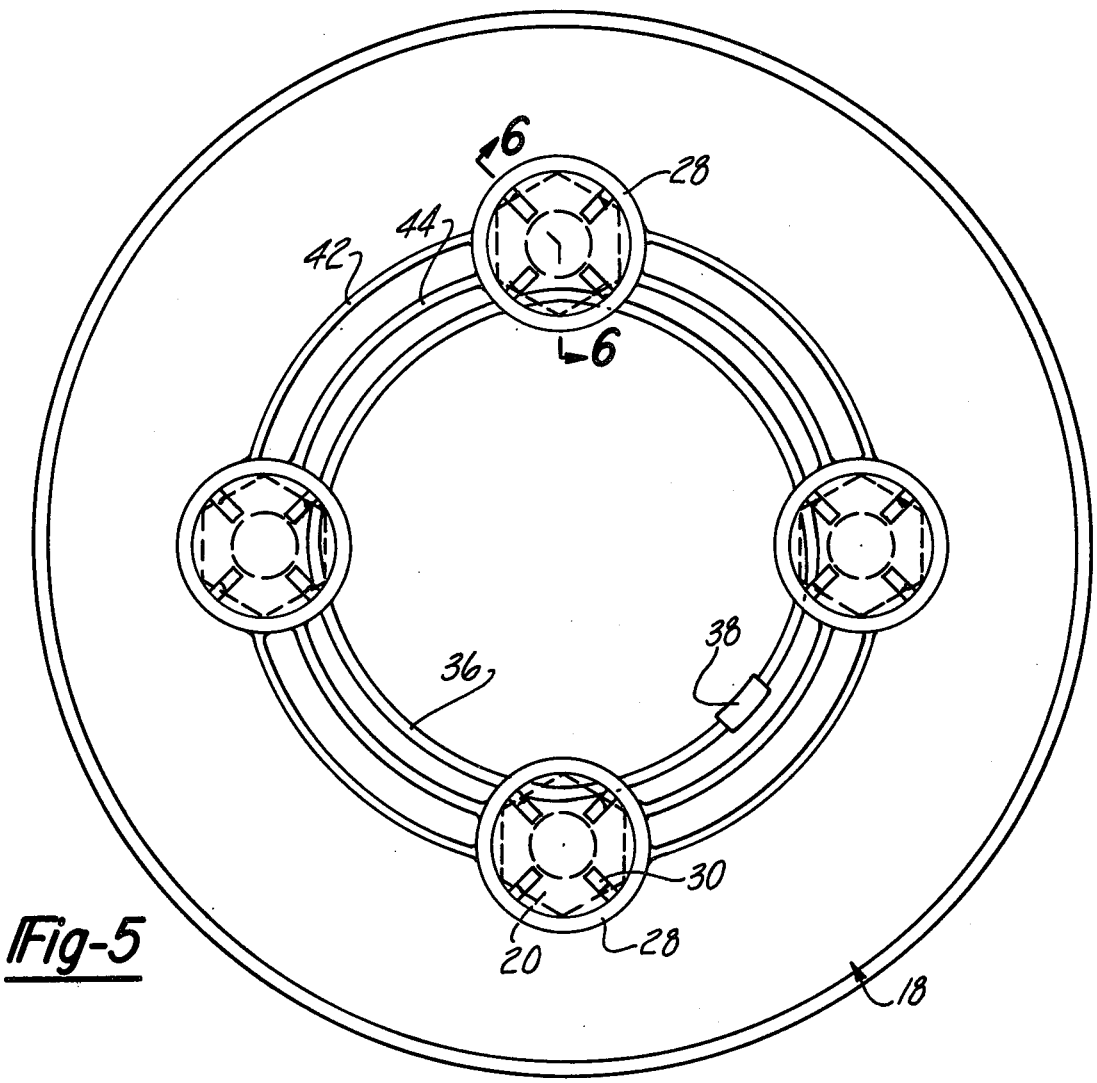
FIG. 5 is a plan view of the inboard face of the trim member.
Figure 6:
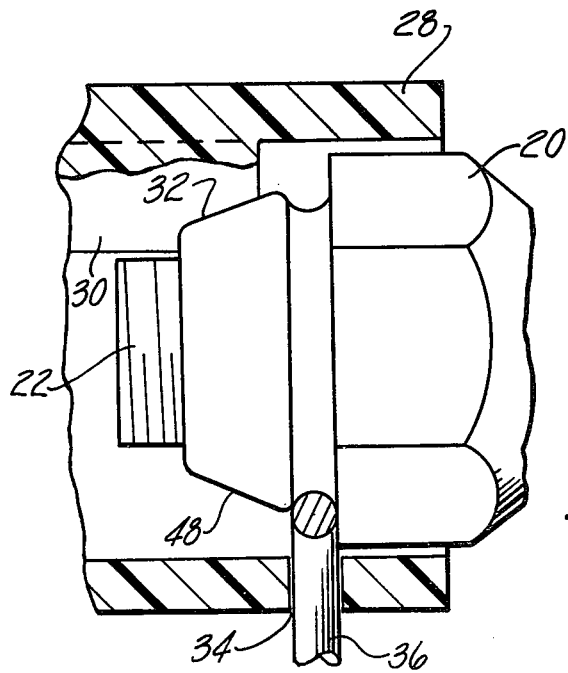
FIG. 6 is an enlarged fragmentary sectional view along the line 6—6 in FIG. 5 and showing the manner in which the spring ring engages a wheel lug nut.
Figure 8:
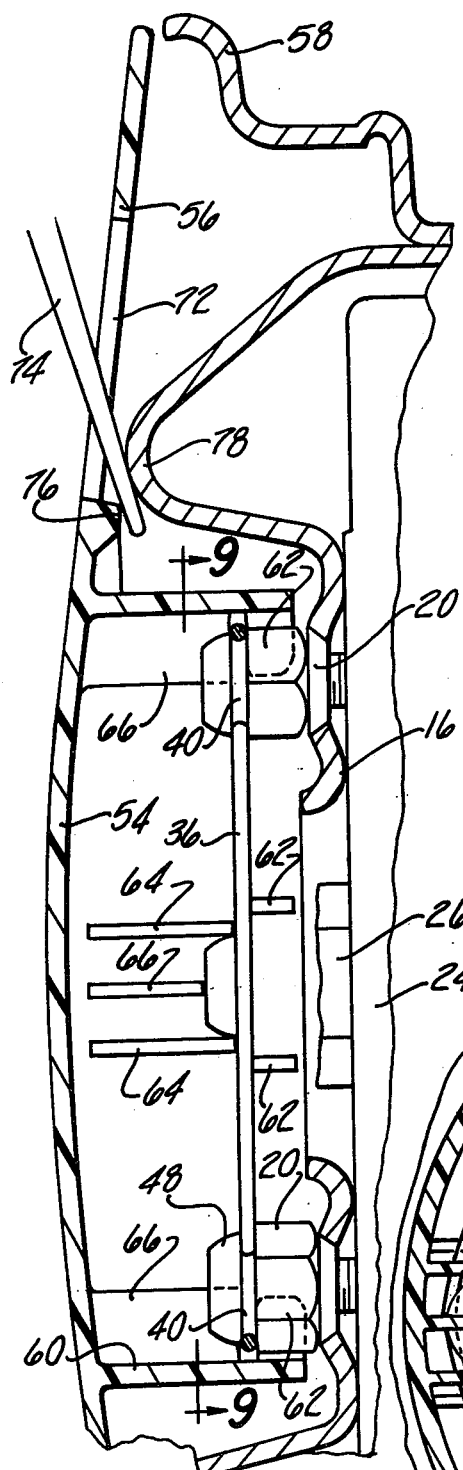
FIG. 8 is a sectional view along the line 8—8 in FIG. 7.
Figure 7:
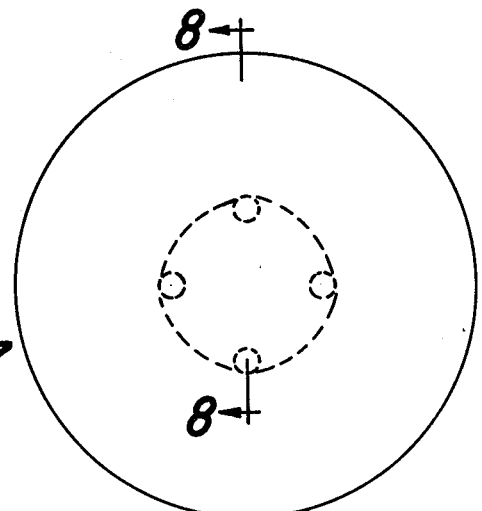
FIG. 7 is a plan view of the outboard face of another trim member according to the present invention.
Figure 10:
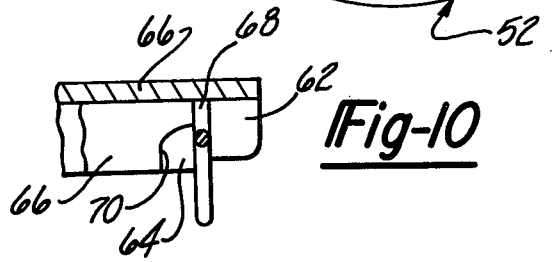
FIG. 10 is a fragmentary sectional view of a portion of the trim member shown in FIG. 8.
Figure 9:
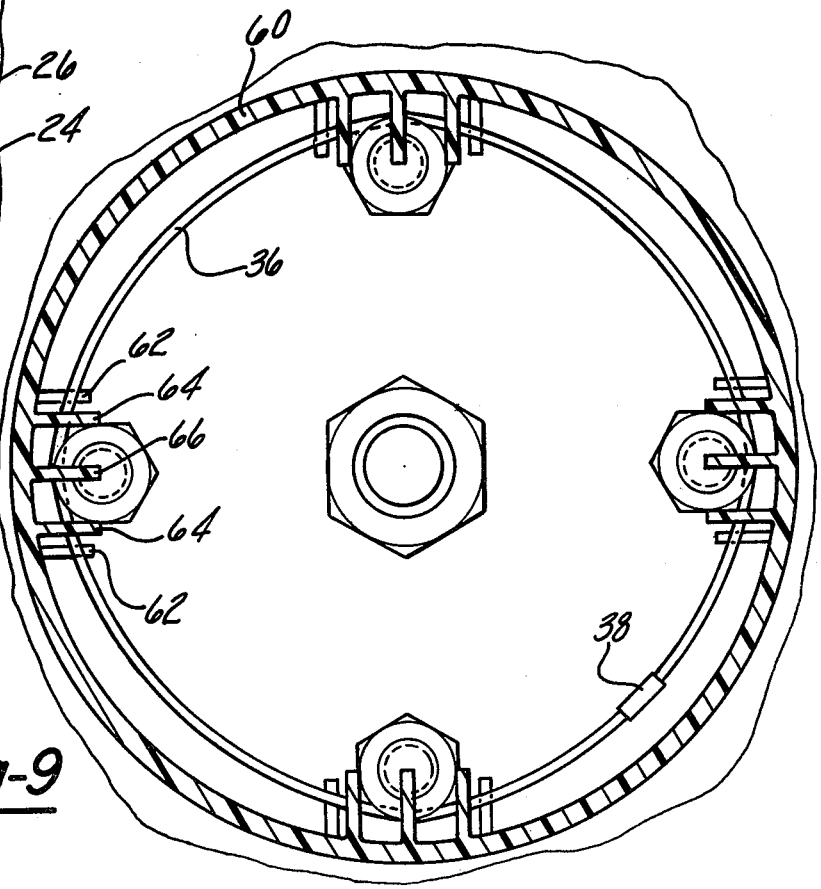
FIG. 9 is a sectional view along the line 9—9 in FIG. 8.

As shown in FIG. 2, each lug nut assembly consists of a conventional arrangement wherein a nut 20 is threaded on a stud 22 fixed to a wheel hub member 24 which, in the arrangement shown in FIG. 2, may comprise a brake drum secured to a wheel axle by means of a nut 26. For purposes of illustration the wheel trim member is shown in the drawings as an integral one-piece plastic molding. It will be apparent, however, that, if desired, the trim member could be formed as a metal stamping.

Hub cap 18 is formed with four integrally molded, tubular projections 28 on its inboard face which extend axially inwardly and which are spaced circumferentially to register with the four lug nut retention assemblies 14. The inner diameter of each projection 28 is only slightly larger than the maximum cross sectional dimension of the lug nuts 20 so that when the hub cap 18 is applied to the outboard face of the wheel with the projections 28 registering with the lug nut assemblies 14, the projections 28 telescope over the lug nuts and thus prevent relative rotation between the hub cap and the wheel. A plurality of radially inwardly extending lugs 30 are formed within each projection 28. The lugs 30 have a shorter axial extent that projections 28 and their axially inner ends are contoured as at 32 (FIG. 6) so as to abut against the outer end portions of nuts 20 to thereby limit the extent to which the hub cap can be displaced inwardly toward the plane of the wheel.

The radially inner side of each circular projection 28 is formed with a slot 34. The four slots 34 lie in a flat plane perpendicular to the central axis of the hub cap 18. Within the four slots 34 there is seated a circular spring wire ring 36, the ends of which are interconnected by means of a ferrule 38 so that the ring 36 has a fixed circumferential dimension. Each lug nut 20 is formed with a circumferentially extending groove 40 adjacent, but spaced axially inwardly of, its outer end. The grooves 40 are located axially such that, when the nuts 20 are tightened against the bolt-on flange 16 of the wheel, they lie in a plane which is generally coplanar with the plane of ring 36. Grooves 40 are of generally semicircular shape in cross section and have a radial depth at least slightly less than the cross sectional radius of the wire which forms the ring 36. In the arrangement shown in FIGS. 1 through 6 the outer diameter of ring 36 is slightly greater than the dimension between the roots of grooves 40 in the diametrically opposed nuts 20. For the purpose of imparting substantial rigidity to the hub cap as a whole it is formed with a pair of circumferentially extending and radially spaced flanges 42,44 extending axialy inwardly from the inboard face thereof. Flanges 42,44 extend circumferentially between and interconnect the successive tubular projections 28. Slots 34 extend around the radially inner sides of projections 28 and terminate at each end adjacent the junction between flange 44 and the periphery of the projections 28. These slots 34 have a width at least slightly greater than the diameter of the wire forming ring 36, the ring being seated in these slots so that it extends circumferentially around the inner sides of flanges 44.

When it is desired to mount the hub cap on the wheel it is applied concentrically to the outboard face of the wheel with the tubular projections 28 aligned with the nuts 20. This circumferential alignment is facilitated by the fact that the axially inner edges of flanges 42,44 are tapered axially outwardly from their mid point to the adjacent projections 28 as shown at 46 in FIG. 2. As the contoured ends 32 of lugs 30 approach the outer ends of nuts 20, the portions of ring 36 within the four slots 34 engage the rounded outer ends 48 of the nuts 20 so that further axial inward movement of the hub cap causes these portions of the ring to be displaced radially inwardly and eventually snap into engagement with the grooves 40 on the nuts. When ring 36 is so engaged with the grooves 40, the portions of the ring between the successive nuts bow radially outwardly and thus place the ring as a whole under compression. The hub cap is prevented from rotating relative to the wheel by interengagement of the tubular projections 28 and its movement axially of the wheel is restrained by the interengagement of ring 36 with the grooves 40 in the nuts 20 and in the slots 34 in the tubular projections 28.

When it is desired to remove the hub cap from the wheel, a prying tool can be inserted between the peripheral edge 49 of the hub cap and the adjacent hump 50 on the spider of the wheel. When the hub cap is pried outwardly in this manner ring 36 is flexed radially inwardly by the axially outer side of at least two of the grooves 40 which enables the ring to be freely released from the grooves in the remaining nuts 20.

In the arrangement shown in FIGS. 7 through 10 the vehicle wheel trim member is in the form of a plastic molded wheel cover 52 having a central portion 54 adapted to overlie the bolt-on flange 16 of the wheel and an outer annular portion 56 which, when the cover is applied to the wheel, terminates around its outer periphery closely adjacent the outwardly turned edge of the rim 58 of the wheel. The inboard face of the central portion 54 is formed with an integral axially inwardly extending annular flange 60 dimensioned to encircle the lug nuts 20. At four equally spaced sections around its inner periphery flange 60 is formed with generally radially inwardly extending ribs 62,64,66. The two widely spaced ribs 62 in each set are relatively short and extend axially outwardly from the inner edge of flange 60. The two ribs 64 are spaced apart circumferentially a distance corresponding generally to the largest diameter of the rounded portion 48 of lug nuts 20. Ribs 64 terminate at their inner ends in a plane spaced outwardly from the axially outer ends of ribs 62 so as to define therebetween a radially extending slot 68 which lies in a flat plane perpendicular to the central axis of the wheel cover. The central rib 66 in each set of ribs extends axially inwardly from the inboard face of the cover and has its inner end contoured as at 70 to engage the outer end portion 48 of the lug nut 20.

In this arrangement the spring steel ring 36 is designed to encircle the radially outer sides of the lug nuts 20 and is adapted to engage the grooves 40 therein in substantially the same manner as described above with reference to FIGS. 1 through 6. However, in this arrangement, when the wheel cover is applied to the wheel, ring 36 is placed in tension, rather than compression, and the portions of the ring between the successive nuts are slightly chorded rather than bowed outwardly as is the case with the previous embodiment described. Since the ring is in tension it must be securely fastened to ferrule 38 to prevent their separation. If desired, the ends of the ring can simply be hooked together rather than using a ferrule such as shown at 38. To facilitate removal of the cover from the wheel the outer annular portion 56 is formed with one or more openings 72 to accommodate the insertion of a prying tool 74 between the inboard face of the wheel as at 76 and a hump 78 on the wheel spider.

Figure 11:
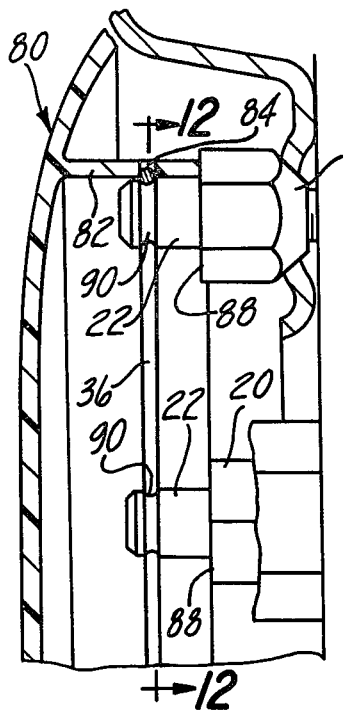
FIG. 11 is a fragmentary sectional view of the another form of wheel trim member according to the present invention.
Figure 12:
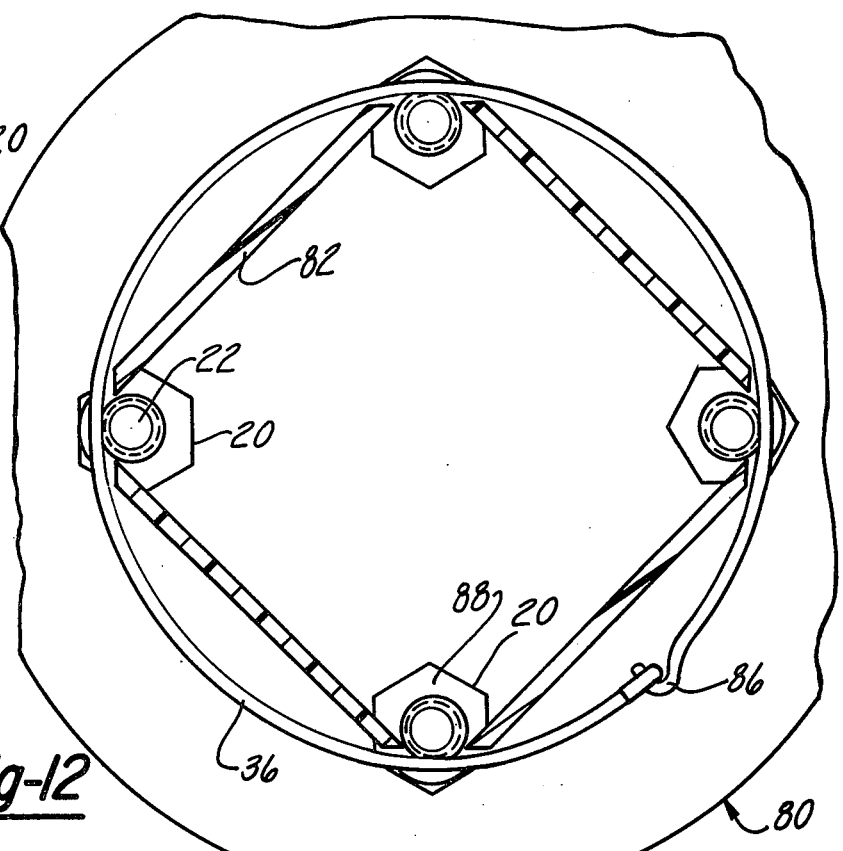
FIG. 12 is a sectional view along the line 12—12 in FIG. 11.

In the arrangement shown in FIGS. 11 and 12 the hub cap 80 is formed with a rectangularly shaped flange 82 extending axially inwardly from the inboard face of the hub cap. The rectangle is dimensioned so that the outer ends of the lug nut studs are engaged by the flange at each corner thereof to prevent relative rotation between the hub cap and the wheel. At each corner thereof flange 82 is slotted as at 84 to accommodate the spring ring 36 which, in this case, has its ends hooked together as at 86. In this arrangement the lug nuts 20 have flat outer end faces 88 against which the inner edge of flange 82 is adapted to abut to position the hub cap axially on the wheel. Adjacent their outer ends the lug nut studs 22 are of slightly reduced diameter and are formed with a circumferential groove 90 into which the ring 36 is adapted to engage. Ring 36 is dimensioned and arranged on the hub cap so as to encircle studs 22 around the radially outer sides thereof so as to be tensioned when the hub cap is applied to the wheel. Insofar as the application and removal of the hub cap from the wheel is concerned, the embodiment shown in FIGS. 11 and 12 functions in substantially the same manner as that described in connection with FIGS. 7 through 10.

Figure 13:
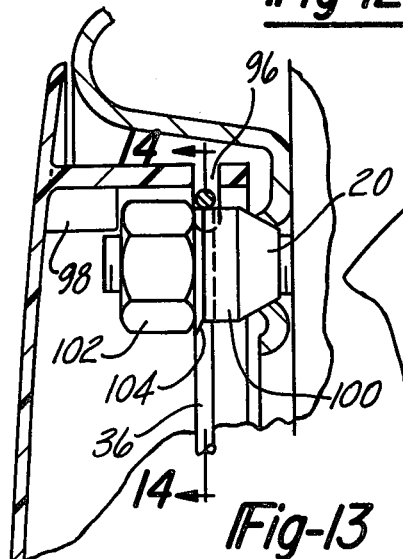
FIG. 13 is a fragmentary sectional view of another form of trim member according to the present invention.
Figure 14:
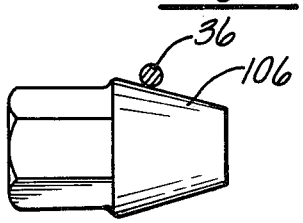
FIG. 14 is a sectional view along the line 14—14 in FIG. 13.
Figure 15:
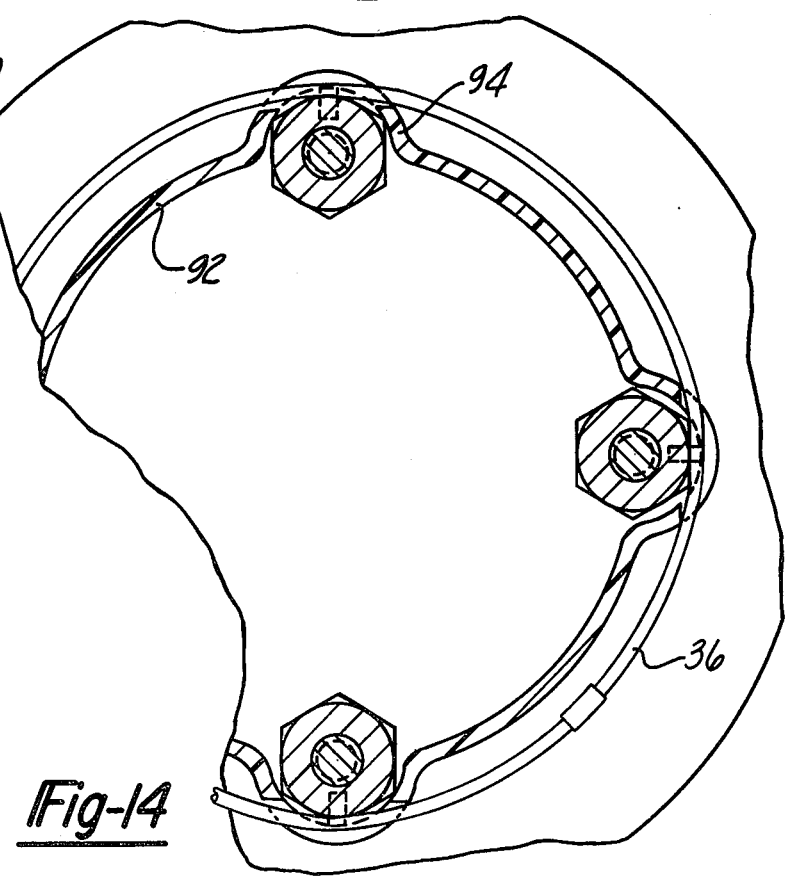
FIG. 15 is a side elevational view of a modified form of lug nut adapted for use with the trim member of the present invention.

The hub cap shown in FIGS. 13 and 14 is formed with an annular flange 92 extending axially inwardly from the inboard face thereof. At four equally spaced points flange 92 is formed with outwardly bowed sections 94 adapted to embrace the lug nuts 20 when the hub cap is applied to the wheel. The radially outer side of each bowed section 94 is slotted as at 96 to accommodate the spring ring 36. Each bowed section 94 is also provided with a radially inwardly extending rib 98 adapted to engage the outer end of lug nut 20 when the hub cap is applied to the wheel. In this arrangement lug nut 20 is provided with a reduced diameter section 100 inwardly of the hexagonal portion 102 and connected thereto by an outwardly inclined shoulder 104. If desired, the lug nut could be shaped as shown in FIG. 15 wherein the inner end portion is simply tapered throughout its axial extent as at 106. The lug nuts shown in FIGS. 13 and 15 have the advantage of being adapted to be formed by a cold heading operation rather than having a groove machined therein as a secondary operation.

The hub cap 110 shown in FIGS. 16 through 19 is similar in construction to the wheel cover shown in FIGS. 7 through 10 with respect to the annular flange 60 and the radially extending ribs 62,64,66. However, in this arrangement the spring ring 112 does not have a fixed circumferential dimension; the ends 114 of the ring are engaged within arcuate slots 116 of a rotary cam plate 118. Cam plate 118 is fixed to the inner end of a stud 120 journalled in a boss 122 on the inboard face of the hub cap. The outer exposed end of stud 120 is formed with a non-circular socket 124 adapted to receive a specially shaped key for rotating the stud. In this arrangement the groove 126 in the lug nuts 20 may have a radial depth greater than one-half the diameter of the wire from which ring 112 is formd so that, when the ring is seated in grooves 126 by rotating cam plate 118 so as to draw the opposite ends of the ring together, the hug cap is effectively locked on the wheel and cannot be removed therefrom unless the stud 120 is rotated so as to shift the opposite ends of the ring circumferentially away from each other and, thus, enable the ring to be released from the grooves 126 in the nuts 20. FIG. 18 illustrates in solid lines the ring 112 fully seated in one of the grooves 126 and in broken lines the ring circumferentially expanded so as to be released from engagement with the grooves 126. This construction can be used to provide an anti-theft hub cap or wheel cover.

Another form of anti-theft hub cap is illustrated in FIGS. 20 through 23. In this arrangement the hub cap 130 is formed with five tubular sockets 132 extending axially inwardly from the inboard face thereof. The open end of each socket 132 is dimensioned to have a close fit with and seat on the rounded outer end portion of the five lug nut studs 22 on the wheel. The radially outer sides of the sockets 132 are slotted as at 134 to accommodate the spring ring 136. Slots 134 are located axially so that ring 136 will register with grooves 138 adjacent the outer ends of studs 22 when the hub cap is applied to the wheel. The parted hook ends 140 of ring 136 are engaged within axially inclined slots 142 in a cam plate 144. Plate 144 is generally flat and has a radially inwardly extending flange 146 along its outer edge engaged in a spirally slotted cam track 148 formed in the skirt of a shallow cup 150. Cup 150 is fixed to the inner end of a stud 152 journalled at the center of the hub cap. The outer exposed face of stud 152 is formed with a noncircular recess 154 shaped to accommodate a special key for rotating the cup 150. With this arrangement when cup 150 is rotated in one direction cam plate 144 is shifted axially outwardly so that ends 140 of ring 136 are displaced circumferentially away from one another. This will enable the ring 136 to be released from within the grooves 138 in studs 22. When cup 150 is rotated in the opposite direction cam plate 144 is shifted axially inwardly by cam track 148 so as to draw the ends 140 of the ring closer together and thereby cause the ring to seat in the grooves 138. Grooves 138 are preferably shaped and dimensioned so that the ring 136 cannot be released therefrom unless the ends 140 are shifted circumferentially apart.

In each of the embodiments illustrated and described it will be noted that the spring ring is mounted on the trim member so that it is free to flex radially without restriction from the hub cap to the required extent for engaging the lug nuts or studs. The retention forces generated are thus transferred by tension or compression of the spring ring directly to the lug nut studs and not to the trim member.

We claim:

1. In combination, a vehicle wheel and a trim member adapted for application to the outboard face of the wheel, said wheel being of the type having a central bolt-on flange adapted to be secured to a wheel hub by at least three fasteners in the form of nuts threaded on studs which are spaced circumferentially around a circle concentric with the central axis of the wheel, said trim member having a central body portion adapted to concentrically overlie said bolt-on flange and hub and having retention means thereon adapted to releasably engage said fasteners for retaining the trim member against displacement in an axially outward direction on the wheel, each of said fasteners having a circumferentially extending recess therein which forms an axially inwardly facing shoulder on the fastener spaced axially inwardly from the axially outer end thereof, said retention means comprising a resiliently flexible ring, means mounting said ring on the inboard face of said central body portion of the trim member such that the ring is concentric with the central axis of the wheel when the trim member is applied to the wheel, said ring mounting means including means on the trim member forming a plurality of circumferentially spaced, radially extending slots lying in a flat plane perpendicular to the central axis of the trim member, said ring having portions thereof extending circumferentially through said slots and being retained thereby against axial movement relative to the trim member, said ring having circumferentially spaced segments adapted to seat in said recesses and frictionally engage said shoulders to retain the trim member on the wheel, said ring being dimensioned in relation to the circle defined by the recesses on said fasteners as to require it to flex radially through a predetermined extent to seat said circumferentially spaced segments in said recesses and to cause said segments to apply a radial force against the fasteners when seated in said recesses, said slots having a radial extent in relation to the dimension of the ring to permit the ring to flex radially through said predetermined extent freely without restriction from said trim member when the trim member is applied to the wheel, said trim member also having a plurality of circumferentially spaced abutments thereon arranged to engage the fasteners when the trim member is applied to the wheel as to restrict the extent of relative rotation between the wheel and the trim member, each of said segments being of arcuate contour and having a radius of curvature substantially greater than the radius of curvature of each recess in the fastener so that the radial force applied by the segments against the fasteners is substantially unaffected by relative rotation between said ring and the wheel.

2. The combination called for in claim 1 wherein said abutments are located on circumferentially opposite sides of each of said fasteners.

3. The combination called for in claim 2 wherein said slots are formed on said abutments.

4. In combination, a vehicle wheel and a trim member adapted for application to the outboard face of the wheel, said wheel being of the type having a central bolt-on flange adapted to be secured to a hub by at least three fasteners in the form of nuts threaded on studs which are spaced circumferentially around a circle concentric with the central axis of the wheel, said trim member having a central body portion adapted to concentrically overlie said bolt-on flange and hub and having retention means thereon adapted to releasably engage said fasteners for retaining the trim member against displacement in an axially outward direction on the wheel, each of said fasteners having a circumferentially extending recess therein which forms an axially inwardly facing shoulder on the fastener spaced axially inwardly from the axially outer end thereof, said retention means comprising a resiliently flexible ring, means mounting said ring on the inboard face of said central body portion of the trim member such that the ring is concentric with the central axis of the wheel when the trim member is applied to the wheel, said ring mounting means including means on the trim member forming a plurality of circumferentially spaced, radially extending slots lying in a flat plane perpendicular to the central axis of the trim member, said ring having portions thereof extending circumferentially through said slots and being retained thereby against axial movement relative to the trim member, said ring having circumferentially spaced segments adapted to seat in said recesses and frictionally engage said shoulders to retain the trim member on the wheel, said ring being dimensioned in relation to the circle defined by the recesses on said fasteners as to require it to flex radially through a predetermined extent to seat said circumferentially spaced segments in said recesses, said slots having a radial extent in relation to the dimension of the ring to permit the ring to flex radially through said predetermined extent freely without restriction from said trim member when the trim member is applied to the wheel, said trim member also having a plurality of circumferentially spaced abutments thereon arranged to engage the fasteners when the trim member is applied to the wheel as to restrict the extent of relative rotation between the wheel and the trim member, said ring being circular and having a diameter dimensioned in relation to the circle defined by the recesses in the fasteners such that the ring is in a stressed condition when seated in said recesses to thereby produce said frictional engagement with said shoulders.

5. The combination called for in claim 4 wherein said ring is adapted to seat in said recesses at the radially outer side of each fastener and is in tension when seated therein.

6. The combination called for in claim 4 wherein said ring is adapted to seat in said recesses at the radially inner side of each fastener and is in compression when seated therein.

7. The combination called for in claim 4 wherein the ring comprises a wire of circular cross section, said recesses comprising a groove having a radial depth at least slightly less than the diameter of the wire.

8. The combination called for in claim 4 wherein said fasteners are formed with an axially inclined surface adjacent their outer ends to facilitate sliding of the ring axially inwardly over the fasteners, said recesses having an oppositely inclined surface at the axially outer side thereof to permit sliding of the ring axially outwardly out of said recesses.

9. The combination called for in claim 4 wherein each of said segments is of arcuate curvature and concave relative to the fastener with which it is engaged, each segment extending in a direction circumferentially around the associated fastener.

* * * * *